US010709294B2

(12) United States Patent
Abbiati (10) Patent No.: US 10,709,294 B2
(45) Date of Patent: Jul. 14, 2020

(54) DOSING DEVICE FOR A FILTER HOLDER OF AN ESPRESSO COFFEE MACHINE AND DOSING METHOD IMPLEMENTED WITH SUCH A DEVICE

(71) Applicant: Gruppo Cimbali S.p.A., Binasco (IT)

(72) Inventor: Giacomo Abbiati, Binasco (IT)

(73) Assignee: Gruppo Cimbali S.p.A., Binasco (MI) (IT)

( * ) Notice: Subject to any disclaimer, the term of this patent is extended or adjusted under 35 U.S.C. 154(b) by 253 days.

(21) Appl. No.: 15/993,477

(22) Filed: May 30, 2018

(65) Prior Publication Data

US 2018/0344087 A1 Dec. 6, 2018

(30) Foreign Application Priority Data

May 31, 2017 (IT) .......................... 102017000059702

(51) Int. Cl.
*A47J 42/44* (2006.01)
*A47J 31/06* (2006.01)
(Continued)

(52) U.S. Cl.
CPC ............ *A47J 42/44* (2013.01); *A47J 31/0663* (2013.01); *A47J 42/40* (2013.01); *A47J 42/12* (2013.01); *A47J 42/42* (2013.01); *A47J 2203/00* (2013.01)

(58) Field of Classification Search
CPC ........ A47J 42/44; A47J 42/40; A47J 31/0663; A47J 42/12; A47J 42/42; A47J 2203/00;
(Continued)

(56) References Cited

U.S. PATENT DOCUMENTS 5,193,438 A * 3/1993 Courtois ................. A47J 31/42
241/259.1
5,463,934 A * 11/1995 Locati ................. A47J 31/3614
99/286
(Continued)

FOREIGN PATENT DOCUMENTS

AU 2012268779 B2 7/2013
EP 3023041 A1 5/2016
(Continued)

*Primary Examiner* — Ryan J. Walters
(74) *Attorney, Agent, or Firm* — Seed IP Law Group LLP (57) ABSTRACT

A dosing device dispenses predetermined doses of ground coffee into a filter holder of an espresso coffee machine. The dosing device includes a carousel body formed by plural compartments sized to hold respective p doses of ground coffee. Each compartment includes a top opening and a bottom provided with members for opening and closing thereof. The carousel body can be displaced between a first position, in which the top of one of the compartments is at a discharge conduit of ground coffee and a second position in which the bottom of the compartment is positioned above the filter holder. The dosing device disclosure can arrange doses of ground coffee, different from each other, preparing different types of beverage, within respective containment compartments, select the dose for the beverage, select the compartment that contains it, move the compartment to the filter holder, and supply the selected dose to the filter holder.

12 Claims, 8 Drawing Sheets (51) Int. Cl.
   *A47J 42/40*  (2006.01)
   *A47J 42/12*  (2006.01)
   *A47J 42/42*  (2006.01)

(58) Field of Classification Search
   CPC ...... A47J 31/0626; A47J 31/402; A47J 31/42; A47J 31/44
   See application file for complete search history.

(56) References Cited

U.S. PATENT DOCUMENTS

| | | | | |
|---|---|---|---|---|
| 5,850,859 | A * | 12/1998 | Ciaurriz Andueza ... | A47J 42/40 141/361 |
| 8,210,094 | B2 * | 7/2012 | Marcotegui Goni ... | A47J 42/44 99/286 |
| 2006/0201339 | A1 * | 9/2006 | Vetterli .................. | A47J 31/42 99/452 |

FOREIGN PATENT DOCUMENTS

| | | |
|---|---|---|
| ES | 1068358 U | 10/2008 |
| WO | 2012138327 A1 | 10/2012 |

* cited by examiner

DOSING DEVICE FOR A FILTER HOLDER OF AN ESPRESSO COFFEE MACHINE AND DOSING METHOD IMPLEMENTED WITH SUCH A DEVICE

BACKGROUND

Technical Field

The present disclosure relates to a dosing device for providing a predetermined dose of ground coffee to the filter holder of an espresso coffee machine, said dose being that for making a predetermined beverage, comprising a grinder of roasted coffee granules positioned on a support base, a discharge conduit of the ground coffee coming from said grinder, a discharge opening at the end of said conduit, a station, in said support base, for positioning the filter holder to which the dose of ground coffee is supplied.

The disclosure also relates to the method for providing predetermined doses of ground coffee to a filter holder of an espresso coffee machine operated by means of the device.

Description of the Related Art

According to the prior art, the supply of a predetermined dose of ground coffee to the filter holder of an espresso coffee machine is carried out by means of dosing devices which comprise a cylindrical container, associated with a coffee bean grinder, in which, by means of a chute, the ground coffee coming from inside the grinder converges. An example of such prior art is disclosed in ES 1 068358 U.

The upper end of the cylindrical container of the dosing device can be closed by means of a cover while the lower end is closed by a flat wall provided with a first opening, overlying the station of the filter holder, called loading mouth, and a second central opening through which a member is inserted, inside the cylindrical container, with walls arranged in a star about the central vertical axis passing through the opening, to which angular displacements of predetermined width are imparted, by means of a lever which can be operated manually from the outside of the cylindrical container.

Each movement of the lever corresponds to a predetermined volume of coffee powder which, being between two walls of the star-shaped element, is conveyed towards the opening above the station of the filter holder from which it exits by gravity, flowing into the filter holder.

The operating modes of the dosing device indicated above, however, have several drawbacks, among which the fact that the doses which can be dispensed with such a device must necessarily be an integer multiple of the basic dose obtained by moving the star-shaped member which determines the volume of ground coffee conveyed towards the discharge mouth.

It follows that if the volume displaceable with a single angular movement of the star-shaped member corresponds to about 7 grams which is the dose for dispensing an espresso coffee, if the request is that of a beverage known as "coffee cream", whose dose of ground coffee is 9 grams, this dose, not being a multiple of 7, could not be correctly dispensed to the filter holder.

On the other hand, it seems unthinkable to be able to make the star-shaped volumetric meter, in practice the space between two adjacent walls of the star member, so that it can contain a minimum basic dose equal to one gram of coffee, because in addition to constructive difficulties, this would also involve an excessive number of operations to move the lever which drives the star-shaped member to form the dose necessary to prepare the required beverage.

Not least drawback of the dosing devices of the type indicated above is that resulting from the amount, of about 300 to 500 grams, of ground coffee contained in the container in which the star-shaped volumetric member operates. Since the precision of this member also depends on the weight of the coffee column in the angular sectors which necessarily varies as the amount of ground coffee decreases, it therefore requires a continuous restoration, perhaps in an automatic manner to preserve the degree of precision.

The drawbacks mentioned above also add to the quick organoleptic depletion of ground coffee that remains awaiting dispensing.

According to a different operating typology to form the dose necessary for the formation of a predetermined coffee-based beverage, the prior art also knows grinding and dosing devices in which the required dose is ground and directly dispensed within the filter holder by calculating the amount thereof through the operating time of the mills or determining their weight by, for example, electronic weighing devices.

While preserving the organoleptic characteristics of coffee, the dosing technique "on demand" entails however the drawback of requiring a relatively long time to complete the grinding and therefore the dispensing of the dose.

The waiting time is a clear negative factor for businesses in which the flow of customers is high.

The drawbacks mentioned above also add to the quick organoleptic depletion of ground coffee that remains awaiting dispensing.

According to a different operating typology to form the dose necessary for the formation of a predetermined coffee-based beverage, the prior art also knows grinding and dosing devices in which the required dose is ground and directly dispensed within the filter holder by calculating the amount thereof through the operating time of the mills or determining their weight by, for example, electronic weighing devices.

While preserving the organoleptic characteristics of coffee, the dosing technique "on demand" entails however the drawback of requiring a relatively long time to complete the grinding and therefore the dispensing of the dose.

The waiting time is a clear negative factor for businesses in which the flow of customers is high.

OBJECT AND SUMMARY

The object of the present disclosure is to provide a dosing device, associated with a coffee bean grinder, which has structural and functional features which allow overcoming the drawbacks encountered in the dosing systems of the prior art.

These and other objects that will become apparent from the following description are achieved by a dosing device of ground coffee for dispensing predetermined doses of ground coffee into a filter holder of an espresso coffee machine, comprising a grinder of roasted coffee granules positioned on a support base, a discharge conduit of ground coffee coming from said grinder, a discharge opening at the end of said conduit, a station, in said support base, for positioning the filter holder in which the dose of ground coffee is fed, a body provided with of a plurality of compartments wherein the volume of each compartment is at least equal to a respective predetermined dose of ground coffee, each compartment being provided with a top with a relative opening and a bottom, the latter being provided with members for determining the opening and closing thereof, said body being displaceable between a first position in which the open top of one of the compartments is positioned at said opening of the discharge conduit of ground coffee and a second position in which the bottom of one of the compartments is positioned above said station of the filter holder, there being provided an actuator to carry out the displacements of said body provided with compartments, an actuator for actuating said members for opening and closing the bottom of the compartment when the compartment is in the position above the station of the filter holder.

BRIEF DESCRIPTION OF THE DRAWINGS

The disclosure will now be described in greater detail with reference to an embodiment thereof, given only by way of non-limiting example, as illustrated in the accompanying drawings, in which.

DETAILED DESCRIPTION

Figure 1:
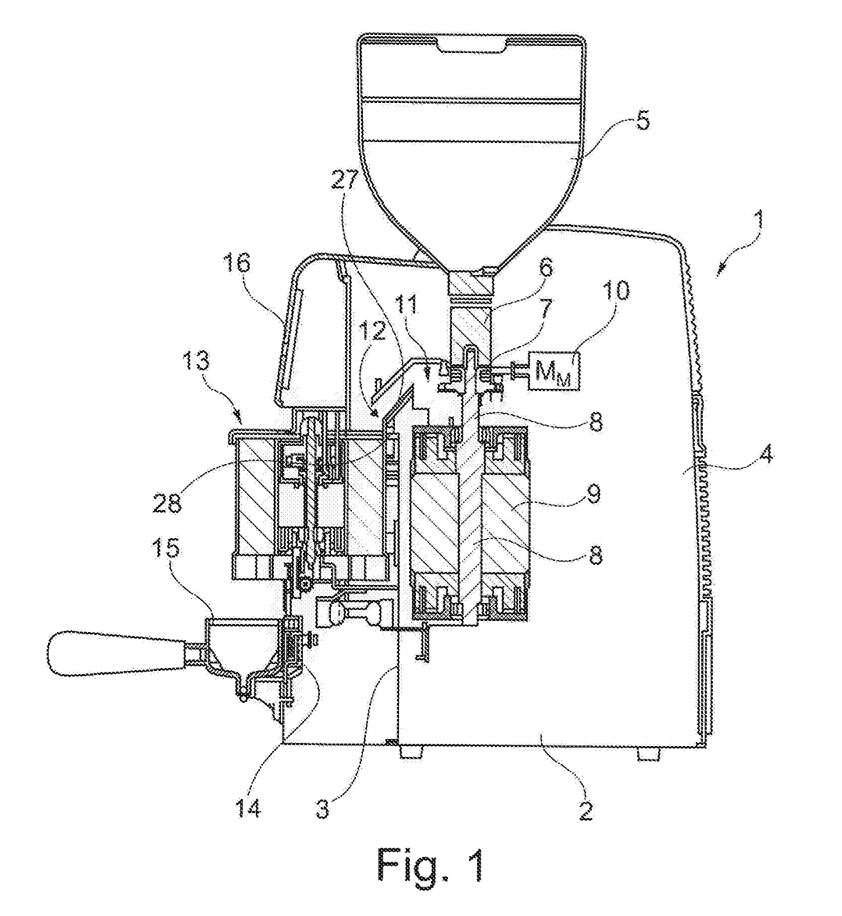
FIG. 1 shows a schematic vertical section of a coffee bean grinder to which the dosing device according to the present disclosure is associated.

With reference to the above figures and in particular to FIG. 1, reference numeral 1 designates as a whole a grinding device for coffee beans comprising a base 2 from which a wall 3 and a column body 4 branch off perpendicularly.

On the top of the column 4 a hopper 5 is conventionally arranged to contain the coffee beans to be ground which, descending by gravity into the underlying channel 6, encounter a conventional pair of mills 7, of which at least one is rotating, being connected to the shaft 8 of an electric motor 9.

The distance between the mills of the pair of mills 7 can be adjusted, by an electric motor 10, in a conventional manner to vary the grinding particle size under the management of a conventional electronic control unit (ECU) not shown.

The ground coffee is started by the centrifugal force exerted by the rotating mill of the pair of mills 7, towards a discharge conduit 11, shown schematically in FIG. 1, the opening 12 of which is directed towards the body of the dosing device, indicated as a whole with reference numeral 13.

Said body 13 is positioned next to the vertical wall 3 of the base 2 to which it is connected directly or with the interposition of a weighing member, as will be better specified in the following description.

The conventional station 14 for the filter holder 15, underlying the dosing device 13, is also connected to base 2.

In a position overlying the dosing device 13, the column 4 of the grinder comprises an electronic interface, indicated with reference numeral 16, which comprises, in addition to the operating commands for the operation of the dosing device, also the conventional electronic control unit (ECU) already mentioned for setting the various operating parameters, not only of the dosing device 13, but also of those of the grinder 1.

With reference to FIGS. 2, 3, 4, 5 and 6, it is noted that the dosing device 13 comprises a plurality of compartments, six in the illustrated example, indicated with 17A, 17B, 17C, 17D, 17E, 17F, arranged in circle around a central rotation shaft 18 with the formation of a body whose overall structure can be defined as a carousel type.

Figure 2:
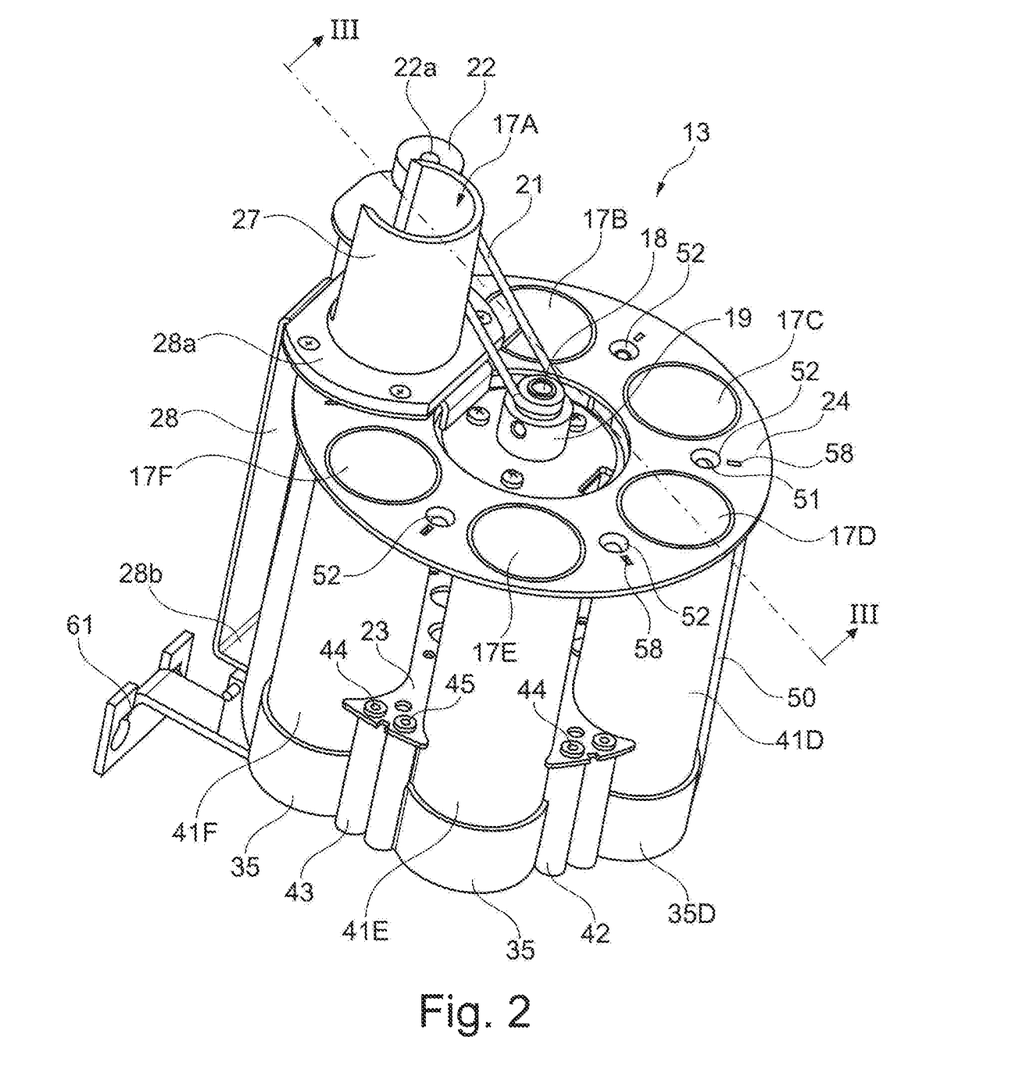
FIG. 2 shows a schematic perspective view of the carousel body of the dosing device according to the disclosure.
Figure 3:
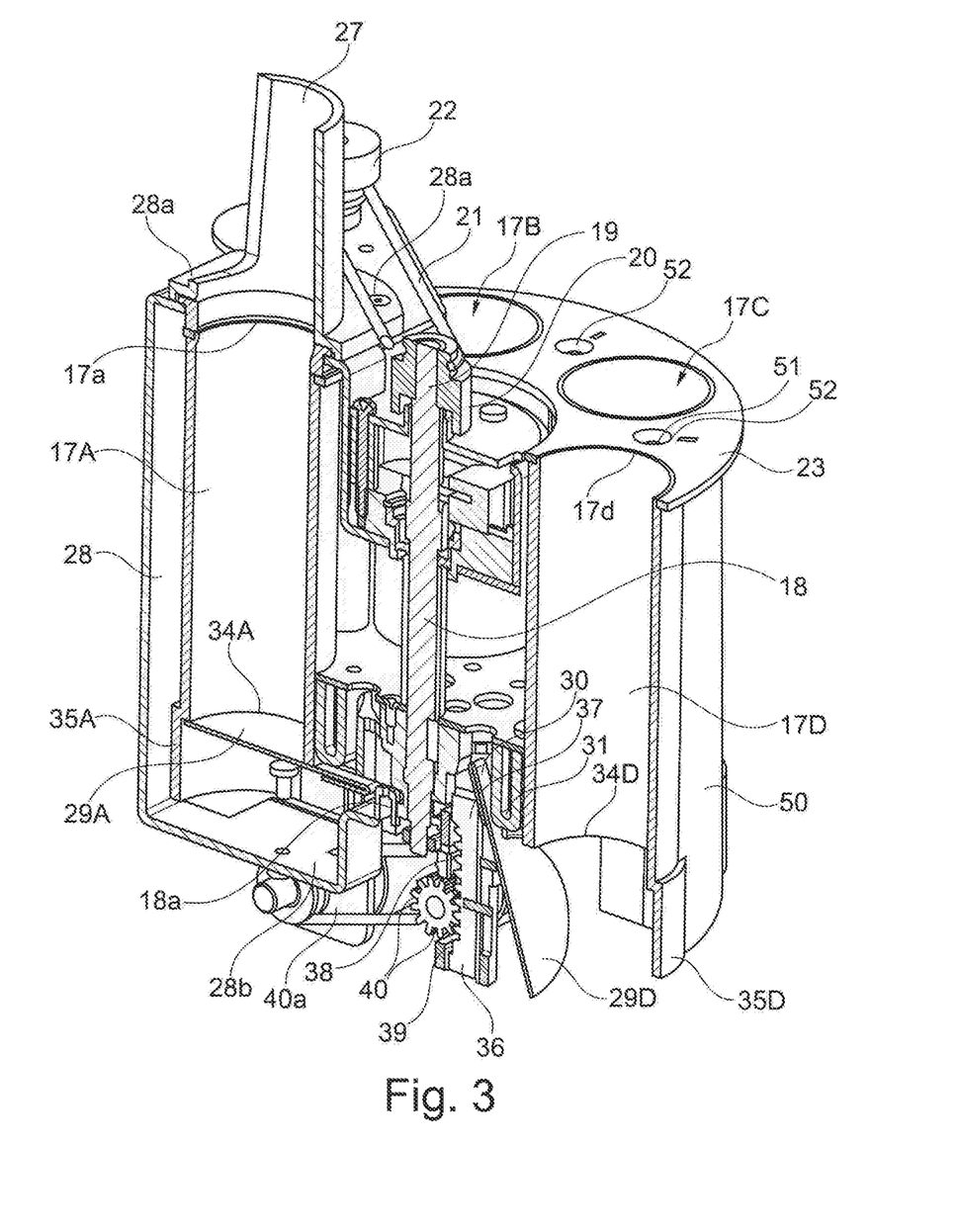
FIG. 3 shows a schematic perspective view of the vertical section of the dosing device made according to the line III-III in FIG. 2.
Figure 4:
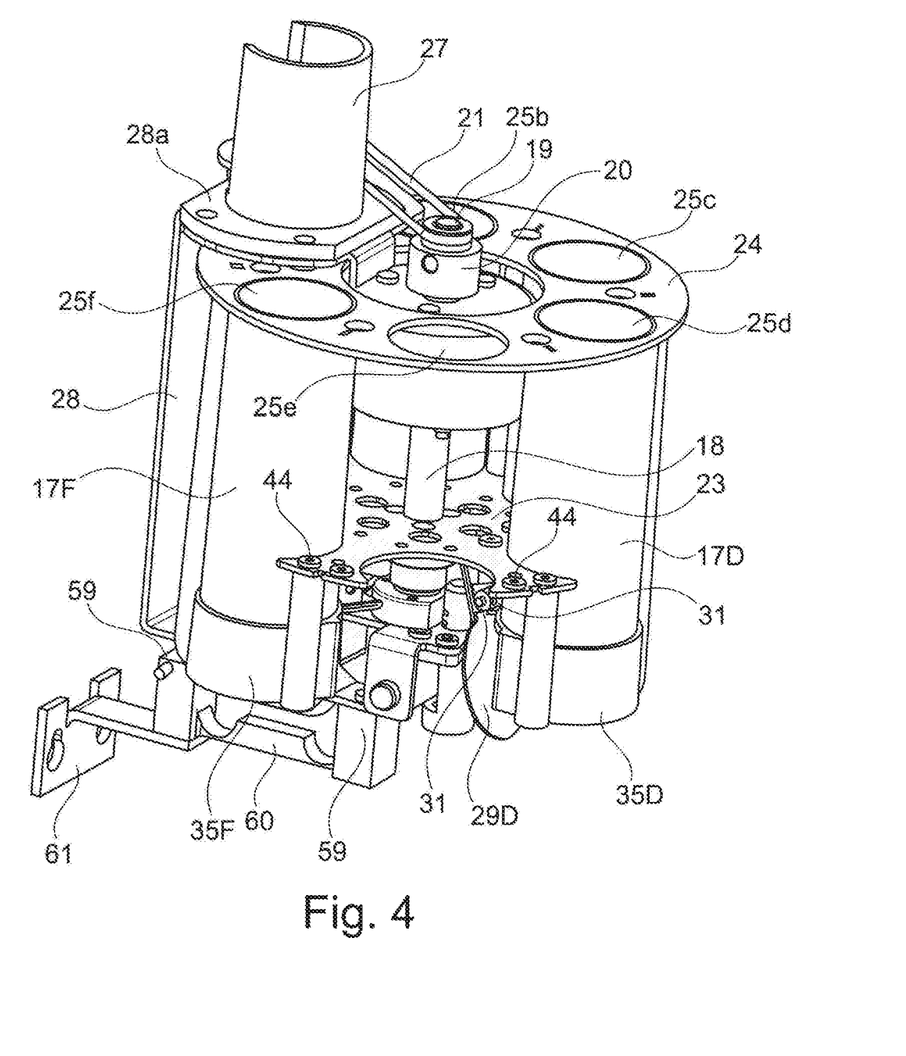
FIG. 4 shows a schematic perspective view of the dosing device in FIG. 2 with some front structural elements removed.

The central shaft 18, in the upper end 19 thereof, is provided with a pulley 20 which engages a transmission belt 21 connected to the pulley 22 keyed on the shaft of a conventional electric motor 22a whose control, as will be seen below, is performed by the electronic control unit (ECU) included in the interface 16.

Figure 5:
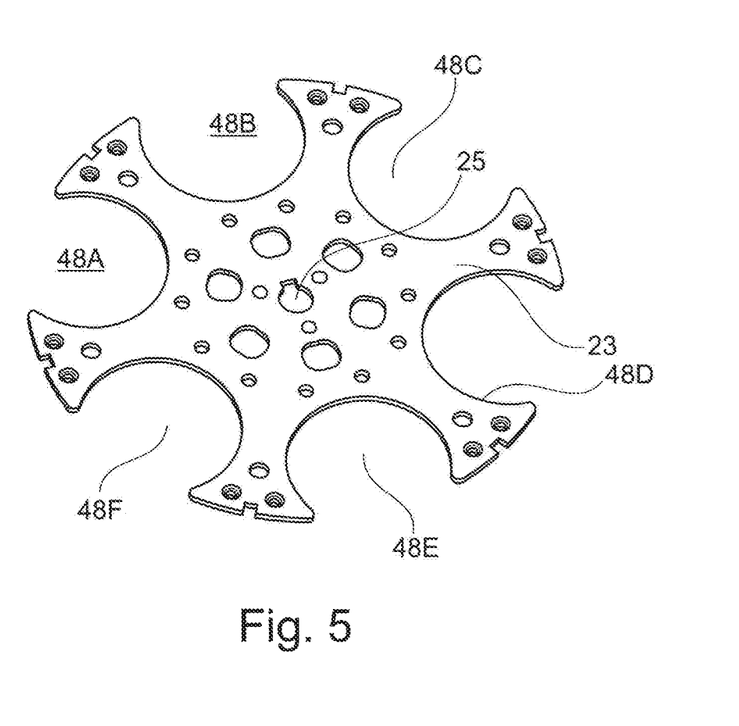
FIG. 5 shows a perspective view of the plate-like lobe element of the carousel structure of the dosing device according to the disclosure.
Figure 6:
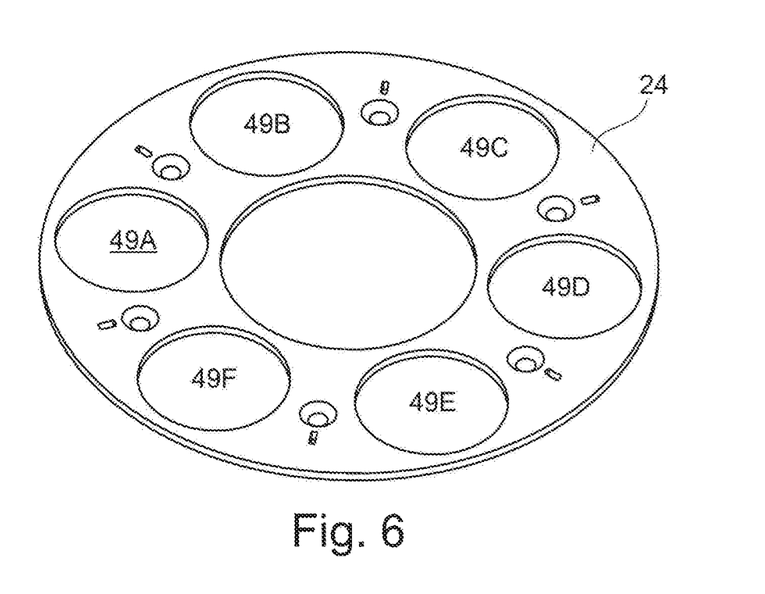
FIG. 6 shows a perspective view of the plate-like element with circular openings of the carousel structure of the dosing device according to the disclosure.

The compartments 17 (A, B, C, D, E, F) are formed by respective cylindrical tubular elements which will be described in detail below and which are held in position, around the central shaft 18, by a first lobed plate 23, shown in FIG. 5, and an overlying plate 24, with circular holes, shown in FIG. 6. The latter plate is positioned at the upper ends of the compartments 17 (A, B, C, D, E, F) where these show the respective openings 25 (a, b, c, d, e, f).

The lobed plate 23 is keyed onto the shaft 18 by means of a hole 26 and is locked therewith by means of a conventional key, not shown, which engages in such a hole.

More details about the mechanical connection modes of the tubular elements that make up the compartments 17 (A, B, C, D, E, F), to the plates 23 and 24 will be apparent from the following description.

With reference to FIGS. 1, 2, 3 and 4, it is noted that the opening 12 of the discharge conduit 11 of the ground product faces a vertical tile 27 which, by means of a plate 28a, is connected to a bracket 28.

The latter, by means of a support 18a, provides to support the shaft 18 in a vertical position and connect the carousel body 13 to the wall 3 of the base 2.

All this in the constructive version that does not provide the use of a weighing device for making doses.

The vertical tile 27 defines, as will be more detailed from the following description, the loading station of the ground product within the compartment 17 (A, B, C, D, F) of the dosing device which, in operation, is in the position below the tile 27 and in front of the opening 12 of the conduit coming from the grinder.

Figure 7:
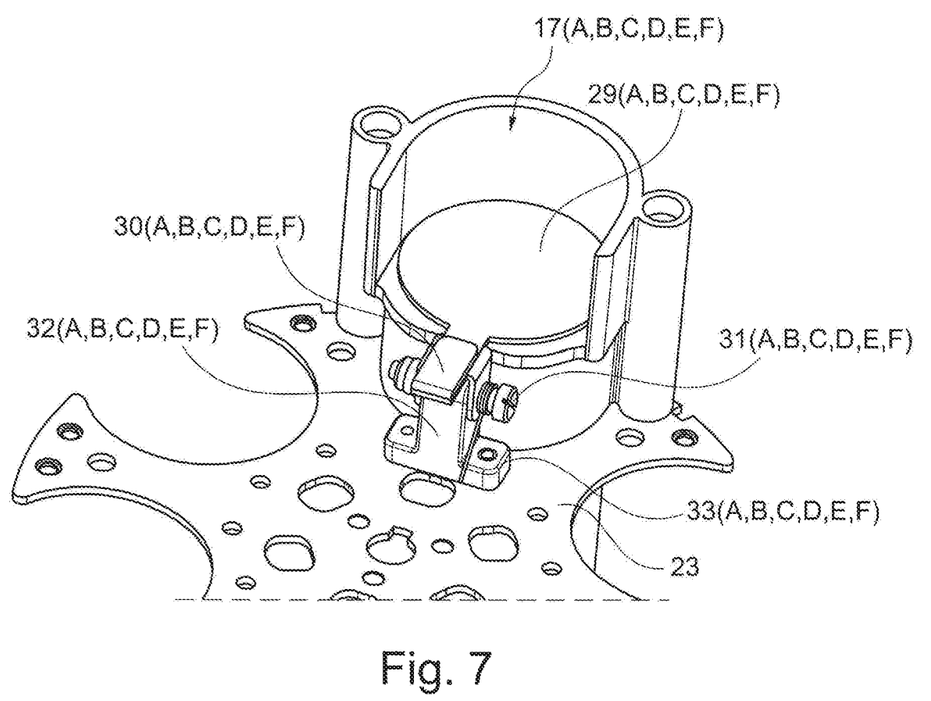
FIG. 7 shows a schematic perspective view, taken from below, of the bottom of one of the compartments constituting the dosing device, provided with an opening and closing plate.

Each compartment 17 (A, B, C, D, E, F) is provided, at the lower end, opposed to the respective upper openings 25 (a, b, c, d, e, f), with a bottom that can be opened and closed consisting of a respective plate 29 (A, B, C, D, E, F), having a circular section like that of compartments 17 (A, B, C, D, E, F).

Each plate 29 (A, B, C, D, E, F) is provided with a radial appendage 30 (A, B, C, D, E, F) and is mounted oscillating about a respective pin 31 (A, B, C, D, E, F) the latter being housed in a respective support 32 (A, B, C, D, E, F) fixed to the lobed plate 23, by means of a conventional base and related screw members.

An elastic member, for example a torsion spring 33 (A, B, C, D, E, F) mounted coaxially on the pin of the plate, determines the positioning thereof against the lower edge 34 (A, B, C, D, E, F), of the respective compartment.

A tubular section 35 (A, B, C, D, E, F), open at the bottom, is provided as an axial extension of each compartment under the closing and opening plate, towards the station 14 of the filter holder 15.

In a position below the lobed plate 23 and supported therewith, the dosing device comprises a mechanism for actuating the plates 29 (ABCDEF) when one of them is in the position above the station 14 of the filter holder 15.

The above mechanism, as can be seen in particular in FIGS. 3 and 4, comprises a pusher 36 whose free end 37 is susceptible of engaging against the radial appendage 30 of each plate 29 when the relative compartment is in a position above the filter holder 15.

The pusher 36 is associated with a rack 38 which, being in engagement with a toothed wheel 39, determines the vertical rectilinear translation, parallel to the shaft 18, of the pusher 36.

The latter, with its end 37, causes the lifting of the radial appendage 30 (A, B, C, D, E, F) of the plate 29 (A, B, C, D, E, F) and, consequently, the opening of the bottom of compartment 17 (A, B, C, D, E, F) which is in said position.

The angular displacement of the plate 29 (A, B, C, D, E, F) occurs in contrast to the spring 33 present on the pin 31 whose elastic action is directed in the direction of keeping the plate 29 (A, B, C, D, E, F) in the closed position against the edge of the relative compartment.

The toothed wheel 39 is placed in rotation, by means of a belt 40, by an electric motor 40a also driven and controlled by the electronic control unit (ECU) of the dosing device.

The electric motor 40a and the set of mechanisms which actuate the pusher 36 are carried by the horizontal wall 28b of the bracket 28.

Figure 8:
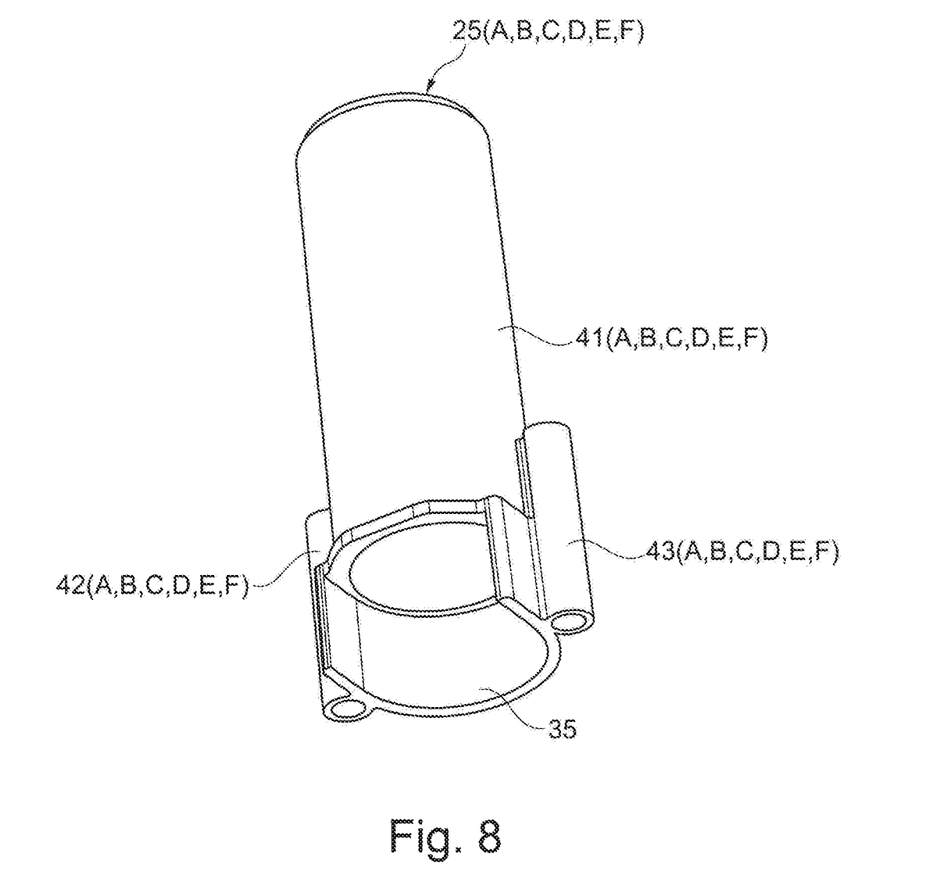
FIG. 8 shows a schematic perspective view of the cylindrical tubular element constituting a compartment of the carousel body forming the dosing device.

With reference to FIG. 8, it is noted that each of the compartments 17 (A, B, C, D, E, F) consists of a respective cylindrical tubular body 41 (A, B, C, D, E, F) provided with an internal volume greater than the volume corresponding to that of the maximum predetermined dose envisaged to be contained in each compartment or in any case at least equal to the latter.

Outside the cylindrical tubular body 41 (A, B, C, D, E, F), diametrically opposed housings 42 and 43 are fixed to accommodate respective fastening screws 44 and 45. The latter engage in respective holes 46 and 47 provided in the lobed plate 23, when the tubular body 41 (A, B, C, D, E, F) is positioned in the respective recess 48 (A, B, C, D, E, F) determining its stable axial and radial anchoring.

With respect to the circular plate 24, each tubular element 41 (A, B, C, D, E, F) is housed in the respective circular hole 49 (A, B, C, D, E, F) which determines its radial containment substantially at the same level as openings 25 (a, b, c, d, e, f).

Figure 9:
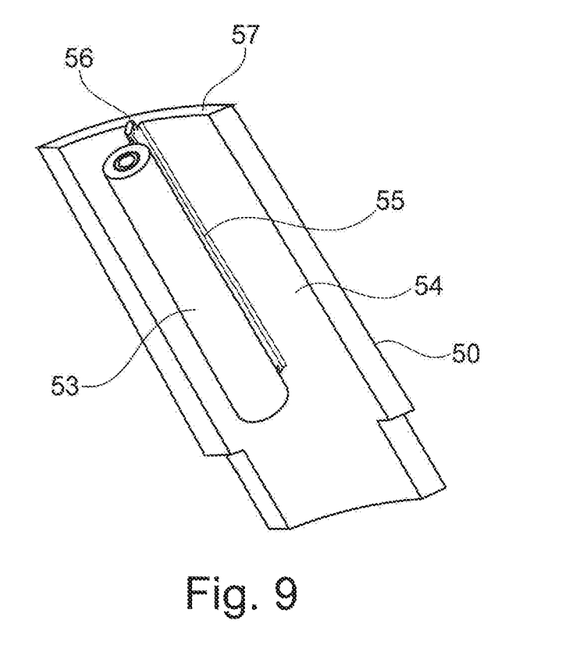
FIG. 9 shows a schematic perspective view of one of the curved elements for closing the contour of the carousel body of the dosing device.

The carousel structure of the dosing device 13, formed by the cylindrical tubular bodies 41 (A, B, C, D, E, F) with the relative compartments 17 (A, B, C, D, E, F), is completed peripherally by affixing, between two adjacent tubular bodies 41, an arched plate-like element 50, shown in perspective in FIG. 9, with a view from its inner part.

The arched shaped elements 50 are fixed to the circular plate 24 by means of a respective screw 51, passing through the holes 52 formed in the plate itself, which engages within a seat 53 on the inner wall 54 of the element 50.

A rib 55, also shown on the inner wall 54 of the element 50, with its end 56 protruding from the upper edge 57 of the element 50, causes a stable positioning of the element, relative to the plate 24, inserting into the corresponding slot 58 of the plate.

The dosing method implemented with the dosing device described above provides for the filling of the compartments 17 (A, B, C, D, E, F) to be carried out with a respective dose of ground coffee, bringing the dosing device compartments in succession, under the control of the electronic control unit (ECU), at the plate 27 which, being in front of the opening 12 of the grinder, defines the loading position of the doses in the respective compartments.

The determination of the dose of ground coffee, according to the beverage to be prepared, according to an embodiment of the dosing device, is carried out according to the time of grinding of the coffee beans used to form the dose.

According to a different embodiment, the determination of the dose in each compartment of the dosing device is carried out by weighing the volume of ground coffee that reaches the compartment.

For this purpose, in the above alternative, as schematically shown in FIGS. 2 and 4, the carousel body, consisting of the compartments 17 (ABCDEF), the plates 23, 24 and the other structural elements which compose it, is connected to one end 59 of a conventional weighing device 60 whose other end 61 allows suspension to the vertical wall 3 of the base 2 of the grinding device.

With the dosing device previously described it is clear that, according to an aspect of the disclosure, a method is implemented for dispensing a predetermined dose of ground coffee in the filter holder of an espresso coffee machine, said dose being that relating to the formation of a certain beverage, comprising the steps of:
  providing a plurality of doses of ground coffee, different from each other, adapted for the preparation of respective different types of beverage, within the respective containment compartments, these being mutually displaceable between a loading position of the relative dose of ground coffee, and an unloading position of said dose into an underlying filter holder;
  selecting the dose relating to the type of beverage required;
  selecting the relevant compartment that contains it;
  moving the compartment containing the selected dose from the position held at the time of its selection to that corresponding to the station of the filter holder;
  dispensing the selected dose in the filter holder by unloading it from the compartment containing it.

It is clear that the plurality of compartments containing a respective dose, in an alternative embodiment of the disclosure, can also consist of only two compartments, one with the precise dose for a traditional espresso coffee, the other with a precise dose for making, for example, of a double espresso or for making a "coffee cream".

Alternatively, while retaining the carousel structure of the dosing device consisting of six compartments 17, as described above, it is possible, through a programming performed with the electronic control unit (ECU) included in the interface 16, to enable the movement of the carousel body so that only two of the compartments 17 of the carousel body are used in the dosing operations.

Alternatively, it is possible to completely disable the functionality of the compartments 17 with the result that the dosing device can also operate in each compartment as an "on demand" grinding-dosing device.

Finally, it is also possible to enable a single compartment 17, making the device particularly suitable in commercial locations with a low number of customers.

With the dosing device according to the disclosure it is therefore possible to provide the type of beverage required in an extremely short time after the customer request, since the waiting time necessary for grinding and forming the dose is eliminated, as this is already prepared within a respective compartment of the dosing device.

Of course, not all the compartments of the carousel body must necessarily be provided with a respective dose of ground coffee and always be ready for dispensing the beverage.

By using the programming allowed by the electronic control unit with which the device is provided, it is clear that the arrangement of the doses in the individual compartments of the carousel body can take place at different times, depending on the expected flow of customers, according to particular times, as well as allow providing doses "on demand".

To this end, it is sufficient to keep one of the compartments empty and available, arrange it, by means of the ECU, at the loading station, have the required dose dispensed by the mill, calculating the grinding time or setting the weight if the device is provided with a weighing device, transfer the compartment, through the same ECU, to the filling station of the filter holder and finally dispense the required beverage by bringing the filter holder with the required dose in the espresso coffee machine.

Other methods of use of the dosing device according to the disclosure are clearly feasible according to the needs of the user, without requiring an indication and description thereof, without departing from the scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A dosing device for dispensing predetermined doses of ground coffee into a filter holder of an espresso coffee machine, comprising:
    a grinder of roasted coffee granules positioned on a support base,
    a discharge conduit of ground coffee coming from said grinder,
    a discharge opening at an end of said conduit,
    a station, in said support base, for positioning the filter holder in which a dose of ground coffee is fed,
    a body provided with of a plurality of compartments wherein the volume of each compartment is equal or greater than to a respective predetermined dose of ground coffee, each compartment being provided with a top, with a relative opening, and a bottom, the bottom being provided with members for opening and closing thereof, said body being displaceable between a first position in which the top of one of the compartments is open and positioned at said opening of the discharge conduit of ground coffee and a second position in which the bottom of one of the compartments is positioned above said station of the filter holder, there being provided a body actuator configured to carry out displacements of said body provided with compartments, and a bottom opening actuator configured to actuate said members for opening and closing the bottom of the compartment when the compartment is in the position above the station of the filter holder.

2. The dosing device according to claim 1, wherein said plurality of compartments are next to each other in a circular carousel configuration, angularly displaceable, in opposite angular directions, around a central rotation axis around which said compartments are arranged.

3. The dosing device according to claim 1, wherein the compartments of said carousel body are all provided with equal volume equal to or greater than that of the predetermined maximum dose to be contained in each compartment.

4. The dosing device according to claim 1, wherein a section of each compartment of said carousel body, transversal to a longitudinal axis extending between the top and the bottom, is circular.

5. The dosing device according to claim 1, wherein said compartments are cylindrical containers arranged parallel to a central rotation axis of said body, supported between two plate-like elements axially spaced apart and attached to a rotation shaft, ends of said shaft being mounted on respective supports, one end of said shaft being connected to said body actuator provided to carry out the angular displacements of the body.

6. The dosing device according to claim 5, wherein, for each compartment, said members for opening and closing of the bottom of the compartment, when the compartment is located in a position above a position of the filter holder, comprise a circular plate provided with a pin, through which the circular plate can move angularly between a position in which the circular plate lies against an edge of the compartment bottom, keeping the compartment bottom closed, and a position in which the compartment bottom is spaced from said edge, with consequent opening of the bottom of the compartment, said pin being rotatably mounted on a support carried by one of the plate-like elements for supporting the cylindrical containers forming the compartments, said circular plate being provided with an appendage which extends radially out from a contour of the circular plate, said appendage being adapted to interfere with a pusher which, in contrast with a spring which maintains said plate in the closed position against the edge of the compartment bottom, by pressing on said appendage, determines an angular displacement of the circular plate about said pin, moving the circular plate away from the edge of the bottom of the compartment.

7. The dosing device according to claim 6, wherein said pusher is actuated by said bottom opening actuator when the compartment is located in a position above the station of the filter holder.

8. A method for dispensing a predetermined dose of ground coffee in a filter holder of an espresso coffee machine, said dose relating to formation of a certain beverage, comprising the steps of:
    providing a plurality of doses of ground coffee, different from each other, adapted for the preparation of respective different types of beverage, within respective containment compartments, the containment compartments being mutually displaceable between a loading position for loading a dose of ground coffee, and an unloading position of said dose into the filter holder;
    selecting the dose relating to a selected type of beverage;

selecting a relevant compartment that contains the selected dose;

moving the compartment containing the selected dose, from a position held when selected the dose, to a station of the filter holder;

dispensing the selected dose into the filter holder by unloading the selected dose from the compartment that contains the selected dose.

9. The method according to claim 8, wherein said step of providing a plurality of doses of ground coffee within the respective containment compartments includes programming, via an electronic control unit, both types of doses to be prepared, and a number of compartments within which the doses are arranged.

10. The method according to claim 9, wherein said programming of the types of doses and/or the number of compartments in which the doses are arranged, varies during a time span.

11. The method according to claim 10, wherein said programming change time span is weekly.

12. The method according to claim 10, wherein said programming change time span is daily.

\* \* \* \* \*